3,336,370
KETO ESTERS
Dale Robert Dill, Webster Groves, Mo., assignor to Monsanto Company, St. Louis, Mo., a corporation of Delaware
No Drawing. Filed Jan. 21, 1965, Ser. No. 427,147
3 Claims. (Cl. 260—483)

This invention relates to a new class of chemical compounds. More particularly, the invention relates to ketocarboxylic acid esters of 2,6,6,8-tetramethyl-4-oxa-3-oxo-nonan-7-ol.

The compounds of this invention may be represented by the formula:

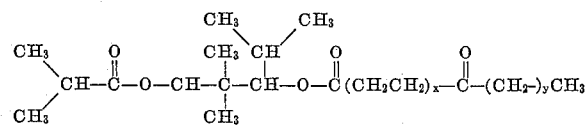

wherein $x$ is zero to 1 and $y$ is zero to 5, with $y$ being zero when $x$ is zero.

The present esters can be readily prepared by reacting a ketocarboxylic acid of the formula:

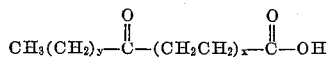

wherein $x$ is zero to 1 and $y$ is zero to 5, with $y$ being zero when $x$ is zero, with 2,6,6,8-tetramethyl-4-oxa-3-oxo-nonan-7-ol.

The invention will be more readily understood by reference to the following examples which describe the detailed preparation of representative compounds. There are, of course, many other forms of the invention which will become obvious to one skilled in the art once the invention has been fully disclosed, and it will accordingly be recognized that these examples are given for the purpose of illustration only, and are not to be construed as limiting the scope of this invention in any way.

Example 1

To a suitable reaction vessel having means for the addition and removal of heat, means for measuring the temperature of the reaction mass, means for agitating the reaction mass, means for the addition and removal of solids and liquids, and fitted with a condenser, there are charged 512 grams (4.4 moles) of levulinic acid, 865 grams (4.0 moles) of 2,6,6,8-tetramethyl-4-oxa-3-oxo-nonan-7-ol and 250 ml. xylene. The mixture is refluxed at about 188° C. for about 24 hours with continuous removal of water. The resultant mixture is then cooled to room temperature and washed with several water and aqueous sodium carbonate washes. The oil layer from the washing step is steam sparged and dehydrated at 135–140° C. The resultant mixture is then distilled in a high vacuum molecular still at 180° C. There is obtained 1091.8 grams (86.8% of theory) of 7-(2,6,6,8-tetramethyl-4-oxa-3-oxo-nonyl) levulinate.

Examples 2–4

Following the procedure of Example 1, 4.4 moles of each of the ketocarboxylic acids tabulated below is substituted for the levulinic acid. The product obtained in each instance is as indicated.

(2)

Acid=4-ketohexanoic
Product=7-(2,6,6,8-tetrametyl-4-oxa-3-oxo-nonyl)-4-ketohexanoate (3)

Acid=4-ketoheptanoic
Product=7-(2,6,6,8-tetramethyl-4-oxa-3-oxo-nonyl)-4-ketoheptanoate (4)

Acid=4-ketooctanoic
Product=7-(2,6,6,8-tetramethyl-4-oxa-3-oxo-nonyl)-4-ketooctanoate Example 5

To a suitable reaction vessel there is charged 88.1 grams (1.0 mole) of pyruvic acid, 250 grams (1.15 moles) of 2,6,6,8-tetramethyl-4-oxa-3-oxo-nonan-7-ol and 100 ml. of xylene. The mixture is heated at 160° C. for about 8 hours with removal of water. The resultant mixture was vacuum distilled in a molecular still to yield 300 grams of 7 - (2,6,6,8 - tetramethyl - 4-oxa-3-oxo-nonyl)pyruvate having an index of refraction of 1.4419 at 25° C.

Example 6

Following the procedure of Example 1, 172.2 grams (1.0 mole) of 4-ketononoic acid, 250 grams (1.15 mole) of 2,6,6,8-tetramethyl-4-oxa-3-oxo-nonan-7-ol and 100 ml. of xylene are utilized to prepare in good yield 7-(2,6,6,8-tetramethyl-4-oxa-3-oxo-nonyl)-4-ketononoate.

Example 7

Following the procedure of Example 1, 186.3 grams (1.0 mole) of 4-ketodecanoic acid, 250 grams (1.15 mole) of 2,6,6,8-tetramethyl-4-oxa-3-oxo-nonan-7-ol and 100 ml. xylene are utilized to prepare 7-(2,6,6,8-tetramethyl-4-oxa-3-oxo-nonyl)-4-ketodecanoate in good yield.

The ketocarboxylates of this invention are useful as plasticizers for vinyl halide-containing polymers. The advantageous properties possessed by the esters of this invention will be more fully understood by reference to the following examples.

The following testing procedures are used in evaluating the physical properties of plasticizers.

*Compatibility.*—Visual inspection of the plasticized composition is employed, incompatibility of the plasticizer with the polymer being demonstrated by cloudiness and exudation of the plasticizer.

*Low-temperature flexibility.*—Low-temperature flexibility is one of the most important properties of elastomeric vinyl compositions. While many plasticizers will produce flexible compositions at room temperature, the flexibility of these compositions at low temperature may vary considerably; i.e., plasticized polyvinyl chloride compositions that are flexible at room temperature often become very brittle and useless at lower temperatures. Low-temperature flexibility tests employed herein are according to the Clash-Berg Method. This method determines the torsional flexibility of a plastic at various temperatures. The temperature at which the vinyl composition an arbitrarily established minimum flexibility is defined at the low-temperature flexibility of the composition. This value may also be defined as the lower temperature limit of the plasticized composition's usefulness as an elastomer.

*Water resistance.*—The amount of water absorption and the amount of water leaching that take place when the plasticized composition is immersed in distilled water for 24 hours is determined.

*Kerosene extraction.*—Resistant to kerosene is measured as follows: A 2" diameter, 40 mil. disc is suspended in a 50° C. oven for a 3-hour conditioning period to eliminate water, then cooled and weighed. The conditioned sample is then immersed in 400 ml. of kerosene for a period of 24 hours at 23° C. The sample is then removed from kerosene, blotted dry and suspended in a force draft 80° C. oven for 4 hours. The sample is then cooled and weighed. The percent loss in weight is reported as the kerosene extraction value.

*Hardness.*—A standard instrument made by Shore Instrument Company is used for this determination and expresses the hardness in units from 1 to 100. The hardness of the composition is judged by its resistance to the penetration of a standard needle applied to the composition under a standard load for a standard length of time.

The following examples illustrate the advantageous and unexpected results which are achieved by the use of the esters of the present invention in vinyl halide-containing polymers, but it is not intended that the invention be limited by or to such examples.

Example 8

One hundred parts by weight of polyvinyl chloride and 60 parts by weight of 7-(2,6,6,8-tetramethyl-4-oxa-3-oxononyl) levulinate, obtained in Example 1, are mixed on a rolling mill to a homogeneous blend. During the milling, substantially no discoloration is observed. The molded sheet is clear and transparent. Testing of the molded sheet for low-temperature flexibility, according to the procedure described above, gives a value of −29.5° C., which value denotes good low-temperature properties. Tests of the water resistance properties of the plasticized material, employing the test procedures described above, indicate a loss of soluble matter of 1.83%. The plasticized material has an initial hardness of 64 and a kerosene extraction value of 7.8%.

Example 9

One hundred parts by weight of polyvinyl chloride and 60 parts by weight of 7-(2,6,6,8-tetramethyl-4-oxa-3-oxononyl)pyruvate, obtained in Example 5, are mixed on a rolling mill to a homogeneous blend. During the milling, substantially no discoloration is observed. The molded sheet of the mixture is clear and transparent. Testing of the molded sheet for low-temperature flexibility, according to the procedure described above, gives a value of −11.2° C., which value denotes good low-temperature properties. Tests of the water-resistance properties of the plasticized material, employing the test procedure described above, indicate a loss of soluble matter of 1.97% and a water absorption value of 0.91%. The plasticized material has an initial hardness of 88. A kerosene extraction value of 4.6% is obtained on this composition.

The ketocarboxylates of this invention additionally imparts excellent stain resistance when incorporated in plastic floor coverings.

While the above examples show only compositions in which the ratio of plasticizer to polymer is 60:100, this ratio being employed in order to obtain comparable efficiencies, the content of ester to polyvinyl chloride may vary widely, depending upon the properties desired in the final product. Generally speaking, about 5 to 200 parts by weight of plasticizer can be used for each 100 parts by weight of vinyl halide-containing resin. However, it is preferred to use from about 20 to 100 parts by weight of plasticizer per 100 parts by weight of resin. The present esters are compatible with polyvinyl chloride over a wide range of concentrations, up to 50% of the ester based on the total weight of the plasticized composition yielding a desirable product.

Although the invention has been described particularly with reference to the use of 7-(2,6,6,8-tetramethyl-4-oxa-3-oxo-nonyl)ketocarboxylates as a plasticizer for polyvinyl chloride, these esters are advantageously employed also as plasticizers for the copolymers of vinyl chloride; for example, the copolymers of vinyl chloride with vinyl acetate, vinylidene chloride, methyl methacrylate, etc. Preferably, such copolymers have a vinyl chloride content of at least 70% by weight of the vinyl chloride and up to 30% by weight of the copolymerizable monomer.

The plasticized polyvinyl halide compositions of the present invention have good thermal stability; however, for many purposes, it may be advantageous to also use known stabilizers in the plasticized compositions. Inasmuch as the present esters are substantially unreactive with the commercially available heat and light stabilizers which are commonly employed with polyvinyl chloride or copolymers thereof, the presence of such materials in the plasticized materials does not impair the valuable properties of the present esters. The present esters are of general utility in softening vinyl chloride polymers. The esters may be used as the only plasticizing component in a compounded vinyl chloride polymer, or they may be used in conjunction with other plasticizers.

While this invention has been described with respect to certain specific embodiments, it is not so limited. It is to be understood that variations and modifications thereof may be made without departing from the spirit and scope of the invention.

The embodiments of the invention in which an exclusive property or privilege is claimed are defined as follows:

1.

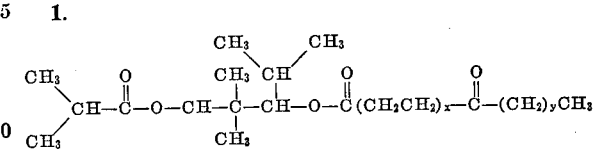

wherein:

$x$ is zero to 1 and $y$ is zero to 5, with $y$ being zero when $x$ is zero.

2. 7 - (2,6,6,8 - tetramethyl - 4 - oxa - 3 -oxo - nonyl) levulinate.

3. 7 - (2,6,6,8 - tetramethyl - 4 - oxa - 3 - oxo - nonyl) pyruvate.

References Cited

Chemical Abstracts, 59:8599, 13828h (1962), 61: 8528d, 14536, (1964).

LORRAINE A. WEINBERGER, *Primary Examiner.*

V. GARNER, *Assistant Examiner.*